(12) United States Patent
Onstad et al.

(10) Patent No.: US 9,610,520 B2
(45) Date of Patent: Apr. 4, 2017

(54) APPARATUS AND METHOD FOR TREATING SLURRIES

(71) Applicant: CALX LIMITED, Cochrane (CA)

(72) Inventors: Lorne Dean Onstad, Calgary (CA); Cordell Simoneau, Cochrane (CA)

(73) Assignee: CALX LIMITED, Cochrane, Alberta (CA)

( * ) Notice: Subject to any disclaimer, the term of this patent is extended or adjusted under 35 U.S.C. 154(b) by 148 days.

(21) Appl. No.: 14/445,910

(22) Filed: Jul. 29, 2014

(65) Prior Publication Data

US 2015/0027963 A1 Jan. 29, 2015

Related U.S. Application Data

(60) Provisional application No. 61/958,379, filed on Jul. 29, 2013, provisional application No. 61/988,536, filed on May 5, 2014.

(51) Int. Cl.
| | | |
|---|---|---|
| *B01D 21/02* | (2006.01) | |
| *B01D 21/00* | (2006.01) | |
| *B01D 21/24* | (2006.01) | |

(52) U.S. Cl.
CPC ....... *B01D 21/003* (2013.01); *B01D 21/0045* (2013.01); *B01D 21/0051* (2013.01);
(Continued)

(58) Field of Classification Search
CPC .............. B01D 21/003; B01D 21/0045; B01D 21/0051; B01D 21/0066; B01D 21/0087; B01D 21/2405; B01D 21/2416
USPC ...................... 210/801, 802, 519, 521, 532.1
See application file for complete search history.

(56) References Cited

U.S. PATENT DOCUMENTS

| | | | | | |
|---|---|---|---|---|---|
| 1,065,542 | A | * | 6/1913 | Main ..................... | B01D 21/245 210/519 |
| 1,190,863 | A | * | 7/1916 | Corne ................ | B01D 21/0045 210/521 |

(Continued)

*Primary Examiner* — Christopher Upton
(74) *Attorney, Agent, or Firm* — Norton Rose Fulbright Canada LLP

(57) ABSTRACT

There is provided a material treatment apparatus. The material treatment apparatus includes a first compartment. The first compartment includes an inlet for receiving supply of slurry material, and a first material conduction space for conducting flow of the supplied slurry material in a downwardly direction. A second compartment is also provided including a second material conduction space for receiving a first intermediate material of the supplied slurry material and conducting the first intermediate material in an upwardly direction. A baffle is provided for interfering with conducting of the supplied slurry material from the first material conduction space to the second material conduction space. A turbulent flow mitigation device is disposed within the first compartment and configured to, upon interaction with the supplied slurry material, to effect adjustment to the flow characteristics of the supplied slurry material to generate a downwardly flowing flow characteristic-adjusted slurry material, wherein the flow characteristics of the supplied slurry material are transformed from turbulent flow to laminar flow. The turbulent flow mitigation device is disposed, relative to the baffle, such that the baffle directs the downwardly flowing flow characteristic-adjusted slurry material to a space below the first baffle. The first material conducting space is fluidly coupled, below the baffle, to the second material conduction space, such that the first intermediate material fraction of the downwardly flowing flow characteristic-adjusted slurry material is conducted to the second material conduction space from below the baffle. A collection region is disposed below the first and second compartments for collecting a separated solids-comprising fraction that has separated, by gravity settling, from the supplied slurry material.

28 Claims, 7 Drawing Sheets

(52) U.S. Cl.
CPC ..... *B01D 21/0066* (2013.01); *B01D 21/2416* (2013.01); *B01D 21/2461* (2013.01)

(56) References Cited

U.S. PATENT DOCUMENTS

| | | | | |
|---|---|---|---|---|
| 2,118,157 | A | * | 5/1938 | Camp ................. B01D 21/2416 210/519 |
| 2,799,645 | A | * | 7/1957 | Musgrove ............... B01D 17/00 210/521 |
| 2,868,384 | A | * | 1/1959 | Puddington ........ B01D 21/2416 210/521 |
| 4,136,012 | A | * | 1/1979 | Louboutin ............ B01D 21/003 210/521 |
| 4,224,157 | A | * | 9/1980 | Jain ..................... B01D 21/2416 210/519 |
| 4,783,255 | A | * | 11/1988 | Bogusch ............ B01D 21/0051 210/802 |
| 5,503,747 | A | * | 4/1996 | Vion .................... B01D 21/003 210/519 |
| 5,605,636 | A | * | 2/1997 | Wyness ................ B01D 21/003 210/521 |
| 5,958,240 | A | * | 9/1999 | Hoel .................. B01D 21/0045 210/802 |
| 2009/0057242 | A1 | * | 3/2009 | Frink .................. B01D 21/003 210/801 |
| 2009/0178975 | A1 | | 7/2009 | Slough et al. ................. 210/702 |
| 2011/0009253 | A1 | | 1/2011 | Pomerleau ...................... 494/23 |
| 2011/0284481 | A1 | | 11/2011 | Pomerleau .................... 210/785 |
| 2012/0279932 | A1 | | 11/2012 | Pomerleau .................... 210/785 |
| 2013/0074360 | A1 | | 3/2013 | Pomerleau ...................... 34/406 |

\* cited by examiner

APPARATUS AND METHOD FOR TREATING SLURRIES

CROSS-REFERENCE TO RELATED APPLICATIONS

This application claims priority to U.S. Provisional Application No. 61/958,379 filed Jul. 29, 2013, and U.S. Provisional Application No. 61/988,536 filed May 5, 2014. The entire contents of each of the above-referenced disclosures is specifically incorporated by reference herein without disclaimer.

FIELD

This disclosure relates to an apparatus for treating a slurry to effect production of a purified liquid, and also to a process for treating a slurry to effect production of a purified liquid.

BACKGROUND

Contaminated liquids, such as spent drilling fluids, require solids removal prior to their re-use within a process from which they originate. To improve economies and improve space utilization, it is desirable to increase efficiency of gravity settling efficiencies within an available footprint.

SUMMARY

In one aspect, there is provided a material treatment apparatus. The material treatment apparatus includes a first compartment. The first compartment includes an inlet for receiving supply of slurry material, and a first material conduction space for conducting flow of the supplied slurry material in a downwardly direction. A second compartment is also provided including a second material conduction space for receiving a first intermediate material of the supplied slurry material and conducting the first intermediate material in an upwardly direction. A baffle is provided for interfering with conducting of the supplied slurry material from the first material conduction space to the second material conduction space. A turbulent flow mitigation device is disposed within the first compartment and configured to, upon interaction with the supplied slurry material, to effect adjustment to the flow characteristics of the supplied slurry material to generate a downwardly flowing flow characteristic-adjusted slurry material, wherein the flow characteristics of the supplied slurry material are transformed from turbulent flow to laminar flow. The turbulent flow mitigation device is disposed, relative to the baffle, such that the baffle directs the downwardly flowing flow characteristic-adjusted slurry material to a space below the first baffle. The first material conducting space is fluidly coupled, below the baffle, to the second material conduction space, such that the first intermediate material fraction of the downwardly flowing flow characteristic-adjusted slurry material is conducted to the second material conduction space from below the baffle. A collection region is disposed below the first and second compartments for collecting a separated solids-comprising fraction that has separated, by gravity settling, from the supplied slurry material.

In another aspect, there is provided a material treatment apparatus comprising: a first compartment including: an inlet for receiving supply of slurry material, and a first material conduction space for conducting flow of the supplied slurry material in a downwardly direction, a second compartment including a second material conduction space for receiving a first intermediate material of the supplied slurry material and conducting the first intermediate material in an upwardly direction, a baffle for interfering with conducting of the supplied slurry material from the first material conduction space to the second material conduction space, and a diffuser plate disposed within the first compartment and configured to, upon interaction with the supplied slurry material, to effect adjustment to the flow characteristics of the supplied slurry material to generate a downwardly flowing flow characteristic-adjusted slurry material. The diffuser plate is disposed, relative to the baffle, such that the baffle directs the downwardly flowing flow characteristic-adjusted slurry material to a space below the first baffle. The first material conducting space is fluidly coupled, below the baffle, to the second material conduction space, such that the first intermediate material fraction of the downwardly flowing flow characteristic-adjusted slurry material is conducted to the second material conduction space from below the baffle. The apparatus also includes a collection region disposed below the first and second compartments for collecting a separated solids-comprising fraction that has separated, by gravity settling, from the supplied slurry material.

In another aspect, there is provided a process of separating material fractions from a supplied slurry material. The process includes flowing the supplied slurry material in a downwardly direction so as to effect interaction between the supplied slurry material and a turbulent flow mitigation, wherein the interaction effects adjustment to the flow characteristics of the supplied slurry material to generate a downwardly flowing flow characteristic-adjusted slurry material, wherein the flow characteristics of the supplied slurry material are transformed from turbulent flow to laminar flow, re-directing flow of at least a fraction of the downwardly flowing flow characteristic-adjusted slurry material in an upwardly direction, and collecting a separated solids-comprising fraction that has separated, by gravity settling, from the flow characteristic-adjusted supplied slurry material.

In another aspect, there is provided a process of separating material fractions from a supplied slurry material comprising: flowing the supplied slurry material in a downwardly direction so as to effect interaction between the supplied slurry material and a diffuser, wherein the interaction effects adjustment to the flow characteristics of the supplied slurry material to generate a downwardly flowing flow characteristic-adjusted slurry material, re-directing flow of at least a fraction of the downwardly flowing flow characteristic-adjusted slurry material in an upwardly direction, and collecting a separated solids-comprising fraction that has separated, by gravity settling, from the flow characteristic-adjusted supplied slurry material.

BRIEF DESCRIPTION OF DRAWINGS

The preferred embodiments will now be described with the following accompanying drawings, in which.

DETAILED DESCRIPTION

Figure 1:
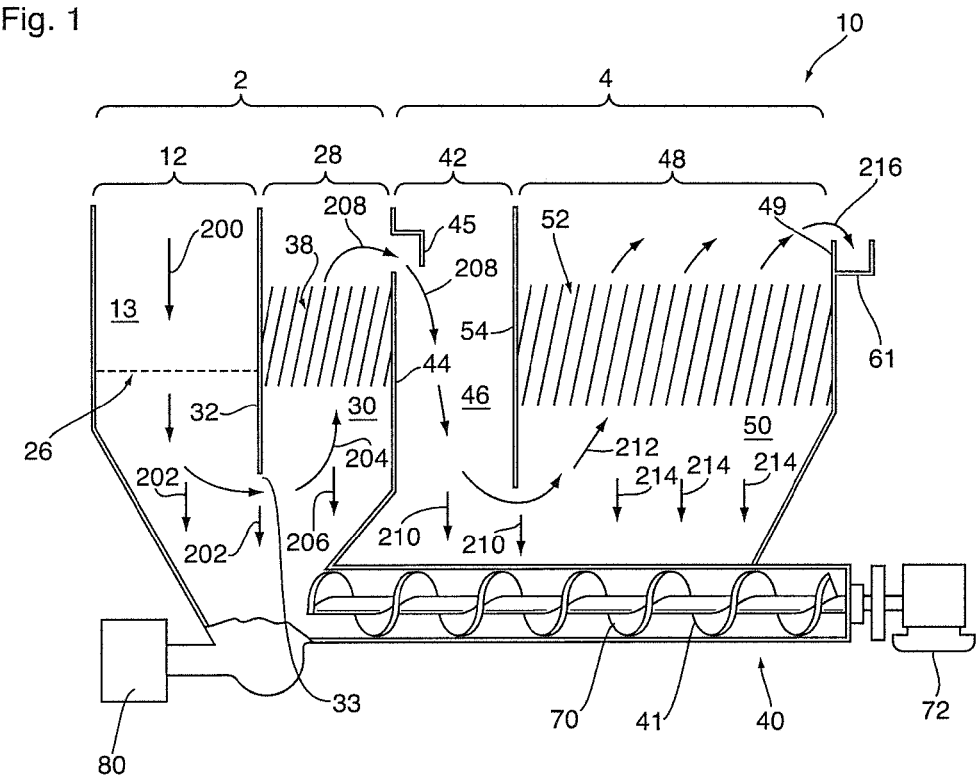
FIG. 1 is a schematic illustration of an embodiment of an apparatus, illustrating the material flows within the apparatus.
Figure 2:
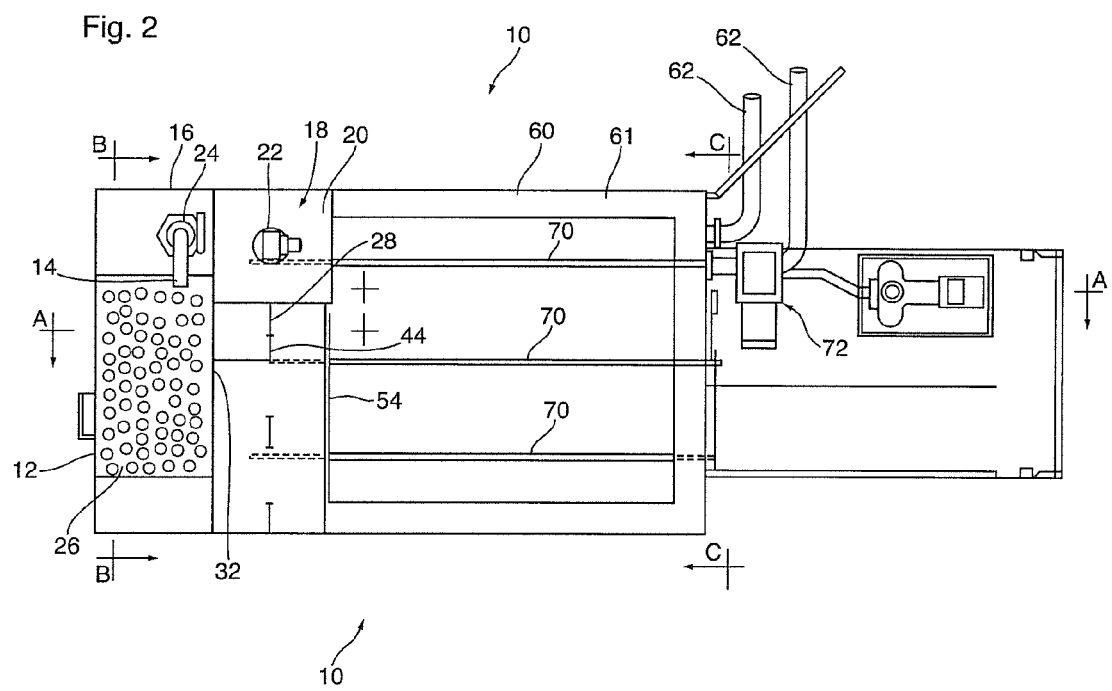
FIG. 2 is a sectional top plan view of an embodiment of an apparatus, with the tube settlers of the second compartment removed for clarity.
Figure 3:
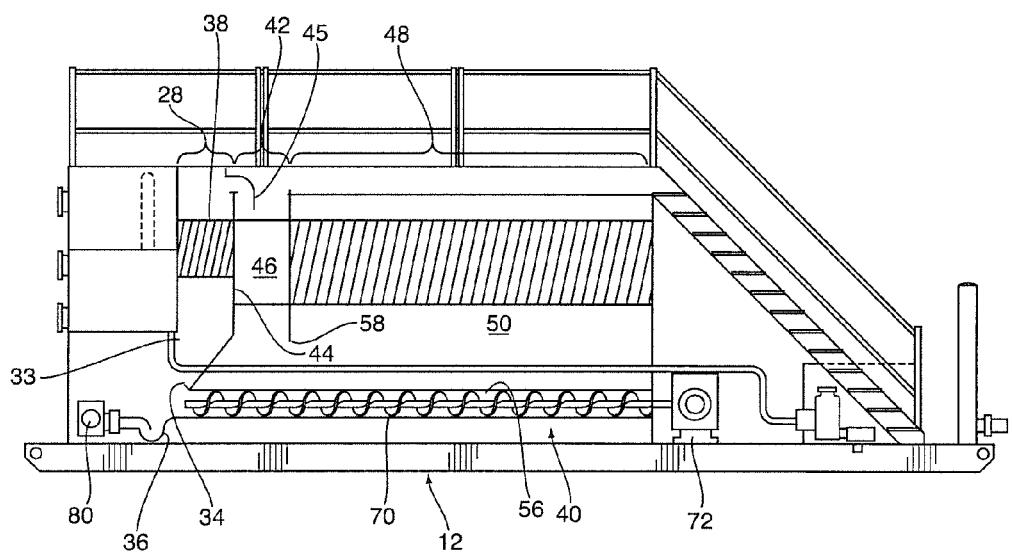
FIG. 3 is a sectional side elevation view of the apparatus of FIG. 2, taken along lines A-A.
Figure 4:
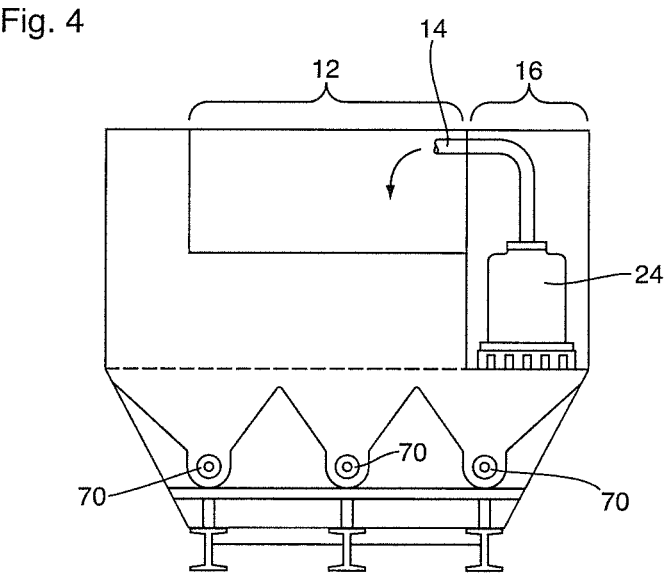
FIG. 4 is a sectional elevation view of one end of the apparatus of FIG. 2, taken along lines B-B.
Figure 5:
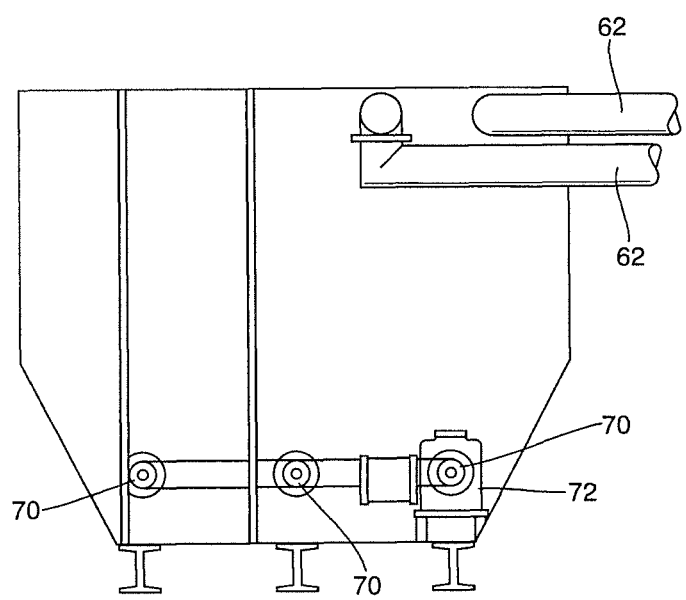
FIG. 5 a sectional elevation view of another end of the apparatus of FIG. 2, taken along lines C-C.
Figure 6:
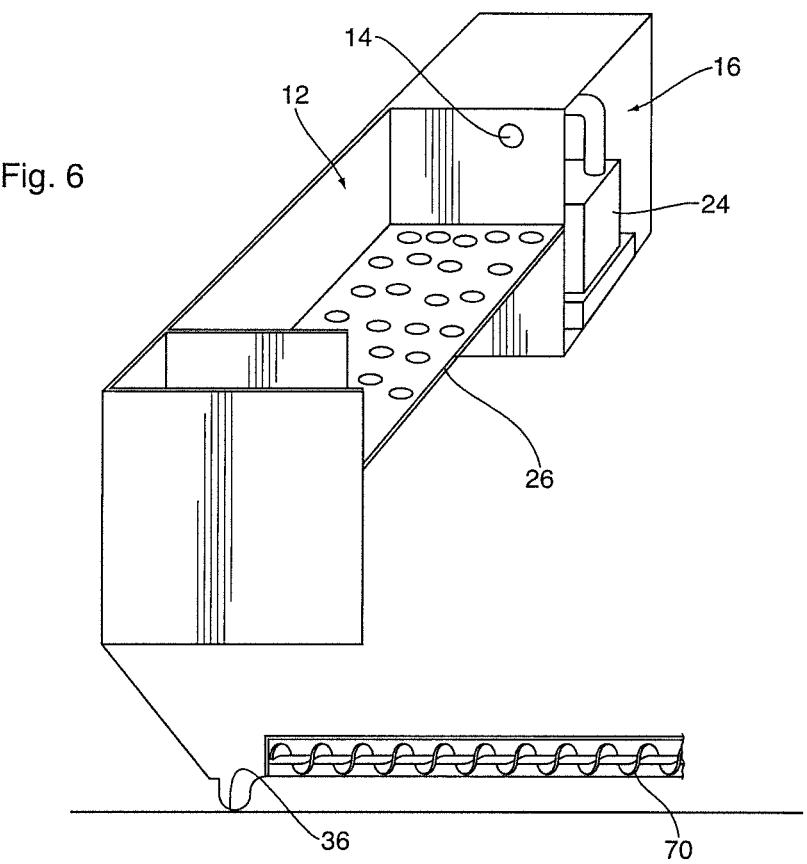
FIG. 6 is a perspective view of a fragment of the apparatus of FIG. 2, illustrating a receiving container, the first compartment with the diffuser, and the first collection region.
Figure 7:
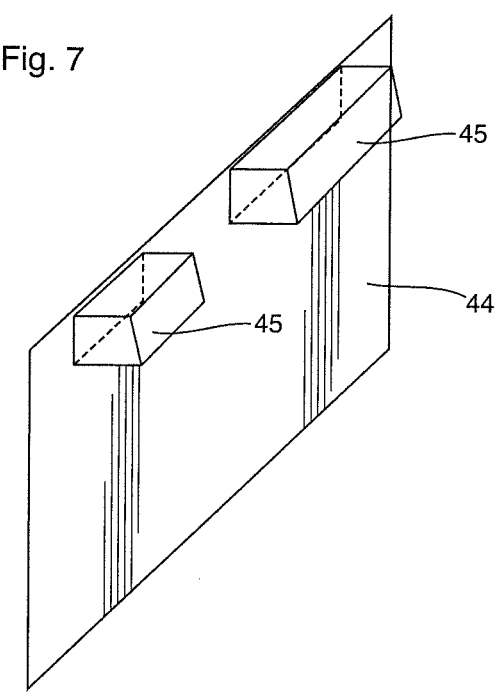
FIG. 7 is a perspective view of the second baffle of the apparatus of FIG. 2.

Referring to FIGS. 1 to 7, there is provided an apparatus 10 for treating a slurry material 200. The apparatus 10 may be mounted on a skid 12.

The slurry material 200 may be any form of slurry. In some embodiments, for example, the slurry material may include contaminated solids or contaminated liquids (such as contaminated water). In some embodiments, for example, the slurry material may include spent drilling fluid, spent drilling fluid being drilling fluid that has been circulated through a wellbore during drilling of a well and having been contaminated by solids and liquids. Spent drilling fluid may include drill cuttings, as well as solids and liquids from the subterranean formation.

The apparatus 10 includes a first compartment 12. The first compartment 12 includes an inlet 14 for receiving supply of slurry material 200. The first compartment 12 also includes a first material conduction space 13. Material, such as the slurry material, received by the inlet 14, is conductible (such as by flowing) in a downwardly direction through the first material conduction space 13.

The slurry material 200 may be supplied from a receiving container 16. In some embodiments, for example, the slurry material may result from preliminary separation processes before becoming disposed within the receiving container. Exemplary separation processes include those effected by any one, or any combination, of a shale shaker, hydrocyclone, centrifuge, or another separator suitable for effecting separation of coarse solids. In this respect, the receiving container 16, in some embodiments, functions as a surge tank.

The apparatus 10 may further include a settling aid injection system 18. The settling aid injection system 18 includes a storage container 20 and a pump 22. The storage container contains a suitable settling aid. The pump effects supply of the settling aid to the receiving tank, so as to effect admixing of a pre-cursor slurry material with the settling aid. In this respect, the slurry material may include an admixture of a pre-cursor slurry material and a settling aid. Exemplary settling aids include flocculating agents, agglomerating agents, and clarifying agents. The flocculating agent may be anionic, cationic or neutrally charged polymers.

The slurry material 200 is supplied from the receiving container 16 to the first compartment 12 with a pump 24, such as a high capacity (e.g. 1250 gpm) pump.

A turbulent flow mitigation device 26 is disposed within the first compartment 12. The turbulent flow mitigation device is configured to mitigate turbulence of the supplied slurry material 200 that is flowing downwardly through the first compartment. In some embodiments, for example, the turbulent flow mitigation device includes a diffuser. In some embodiments, for example, the turbulent flow mitigation device includes an apertured plate that includes a plurality of apertures or holes which provide passage for the downwardly flowing supplied slurry material. In some embodiments, for example, the plate extends across an entire, or substantially an entire, cross-section of the first compartment 14. In some embodiments, for example, the turbulent flow mitigation device is configured to adjust the flow characteristics of the downwardly flowing slurry material such that, as the supplied slurry material is flowing downwardly within the first compartment and within the turbulent flow regime, and the downwardly flowing slurry material interacts with the turbulent flow mitigation device 26, the flow characteristics of the downwardly flowing slurry material become adjusted by the turbulent flow mitigation device 26 such that, after the interaction, the flow of the supplied slurry material (such slurry material, after the interaction, may be referred to as "downwardly flowing flow-characteristic adjusted slurry material 202"), within the first compartment 12, is disposed within the laminar flow regime.

In some embodiments, for example, the downwardly flowing slurry material, with which the turbulent flow mitigation device 26 is configured to interact, with effect that the flow characteristics of the downwardly flowing slurry material are transformed from turbulent flow to laminar flow (i.e. before the interaction, the downwardly flowing slurry material is disposed in the turbulent flow regime, and after the interaction, the downwardly flowing slurry material is disposed in the laminar flow regime), is flowing at a rate of up to 1200 gallons per minute (such as, for example, 1000 gallons per minute), and has up to 50 volume % (such as, for example, 35 volume %) solid material based on the total volume of the downwardly flowing slurry material. In some of these embodiments, for example, such downwardly flowing slurry material has a specific gravity of at least 1.8 (such as, for example, 2.1).

In some embodiments, for example, the downwardly flowing slurry material, with which the turbulent flow mitigation device 26 is configured to interact, with effect that the flow characteristics of the downwardly flowing slurry material are transformed from turbulent flow to laminar flow (i.e. before the interaction, the downwardly flowing slurry material is disposed in the turbulent flow regime, and after the interaction, the downwardly flowing slurry material is disposed in the laminar flow regime), is flowing at a rate of up to 1200 gallons per minute (such as, for example, 1000 gallons per minute), and has a specific gravity of at least 1.8 (such as, for example 2.1).

The apparatus 10 also includes a second compartment 28 defining a second material conduction space 30. The second material conduction space is disposed for receiving a first intermediate material fraction 204 of the supplied slurry material 200. The first intermediate material fraction 204 is depleted in solids relative to the supplied slurry material 200. In this respect, at least a fraction of the solids of the supplied slurry material becomes separated from the supplied slurry material 200, by gravity separation, as a first solids-concentrated material fraction 202, while the supplied slurry material is being conducted towards the second compartment 28.

The second material conduction space 30 includes a gravity settling region 38 for effecting separation, through gravity settling, of at least a solids-depleted material fraction 208 and a second solids-concentrated material fraction 206 from the first intermediate material fraction 204, while the first intermediate material fraction 204 is being conducted in an upwardly direction through the second compartment 28.

A first baffle 32 is disposed between the first material conduction space 13 and the second material conduction space 30. The first baffle 32 is provided for interfering with fluid communication between the spaces 13 and 30 and for directing at least the conduction (such as by flowing) of the supplied slurry material 200 to a space below the first baffle 32. The first material conduction space 13 is fluidly coupled to the second material conduction space 30 below the first baffle 32.

The first compartment 12, the turbulent flow mitigation device 26, the second compartment 28, and the first baffle 32 are co-operatively configured such that flow of the supplied slurry material 200 received within the first compartment is directed downwardly, has its flow characteristics adjusted by the turbulent flow mitigation device 26, and is then directed downwardly to a space below the first baffle 32. While the supplied slurry material is being directed towards a space below the first baffle 32, the supplied slurry material 200 becomes separated into at least the first solids-concentrated material fraction 202 and the first intermediate material fraction 204 by gravity separation. After having been separated from the supplied slurry material 200, the first intermediate material fraction 204 is directed upwardly within the second compartment 28. While the first intermediate material fraction 204 is being directed upwardly within the second compartment 28, the first intermediate material fraction 204 becomes separated into at least the second solids-concentrated material fraction 206 and the solids-depleted material fraction 208. The solids-depleted material fraction 208 may be recovered as an overflow from the second compartment 28.

In some embodiments, for example, the gravity settling region 38 includes a plurality of fluid passages defined between closely spaced inclined surfaces. Providing these fluid passages defined between closely spaced inclined surfaces improves efficiency of separation of the second solids-concentrated material fraction 206 from the first intermediate material fraction 204 within the second compartment 16 (i.e. increases the fraction of solids that is separated from the first intermediate material fraction 204 within the second compartment). This is because the providing of this feature reduces the distance a solid particle or a floc particle must travel before settling on a solid surface, and then directs the settled particle towards the first collection region. In some embodiments, for example, the plurality of fluid passages is defined by a first plate settler disposed within the second compartment. In some embodiments, for example, the plurality of fluid passages is defined by a first tube settler disposed within the second compartment.

A first collection region 34 is disposed below the first and second compartments 12, 28. In this respect, the first collection region 34 is disposed below the first baffle 32. In some embodiments, for example, the lowermost edge 33 of the first baffle 32 is disposed above the collection region by a minimum distance of at least three (3) feet, such as, for example, at least four (4) feet, such as, for example, at least five (5) feet, such as six (6) feet. The first collection region 34 is for collecting a separated solids-comprising fraction that has separated, by gravity settling, from the supplied slurry material 200. The separated solids-comprising fraction includes the first and second solids concentrated material fractions. In some embodiments, for example, the first collection region is defined by a container bottom 36.

In some embodiments, for example, after a sufficient quantity of the separated solids-comprising fraction has been collected within the first collection region 34, the separated solids-comprising fraction that has been collected within the first collection region 34 is discharged from the apparatus 10. In some of these embodiments, for example, the discharging is effected by a material transfer (or conveyor) system 40 which is configured to move the collected solids-comprising fraction to an outlet. In some embodiments, for example, the material conveyor system includes a cross auger 41. The cross auger 41 may be mounted at the base of the apparatus 10 by means of bushing and supports connected to a drive (gear box) and motor 72.

In some embodiments, for example, the transferring or conveyance of the solids collected within the first collection region 34 is effected while, in parallel, the slurry material is being supplied to the apparatus 10 and treated by the apparatus 10 to effect separation of solids from the supplied slurry material, as above described.

In some embodiments, for example, the apparatus 10 further includes a second solids separation zone 4, in addition to a first solids separation zone 2 that includes the first and second compartments 12, 28. In this respect, in some embodiments, for example, the first solids separation zone 2 is a coarser solids separation zone, and the second solids recovery zone 4 is a finer solids separation zone.

The finer solids recovery zone 4 includes a third compartment 42 disposed adjacent to the second compartment 28. The third compartment 42 defines a third material conduction space 46.

A second baffle 44 is disposed between the second and third compartments 28, 42 for interfering with conducting (such as by flowing) of the first intermediate material fraction 204 between the second and third compartments 28, 42 and for directing at least the conduction (such as by flowing) of the first intermediate material fraction 204 upwardly towards a weir 45 extending from the second baffle 44. The second material conduction space 30 is fluidly coupled to the second material.

The third compartment 42 is configured to receive the solids-depleted material fraction 208 from the second compartment 28 as an overflow over the weir 45, and conduct (such as by flowing) the received solids-depleted material fraction 208 through the third material conduction space 46 in a downwardly direction.

The second compartment 28, the third compartment 42, and the second baffle 44 are co-operatively configured such that the flow of the first intermediate material fraction 204 is directed at least upwardly for effecting conduction (such as by flowing) of the first intermediate fraction 204 towards the weir, and while the first intermediate material fraction 204 is being directed towards the weir, the first intermediate material fraction 204 is separated into at least a solids-depleted material fraction 208 and a second solids-concentrated material fraction 206 by gravity separation, and, after having been separated from the first intermediate material fraction 204 by gravity separation, the second solids-depleted material fraction 208 is directed to overflow the weir 45 into the third compartment 42.

A fourth compartment 48 is also provided and defines a fourth material conduction space 50. The fourth material conduction space 50 is disposed for receiving a second intermediate material fraction 212 of the received solids-depleted material fraction 208. The second intermediate material fraction 212 is depleted in solids relative to the received solids-depleted material fraction 208. In this respect, at least a fraction of the solids of the received solids-depleted material fraction 208 becomes separated from the received solids-depleted material fraction, by gravity separation, as a third solids-concentrated material fraction 210, while the supplied solids-depleted material fraction is being conducted towards the fourth compartment 48.

The fourth material conduction space 50 includes a gravity settling region 52 for effecting separation, through gravity settling, of at least a finer solids-depleted material fraction 216 and a finer solids-concentrated material fraction 214 from the received second intermediate material fraction, while the second intermediate material fraction is being conducted (such as by flowing) in an upwardly direction through the fourth compartment 48.

A third baffle 54 is disposed between the material conduction space 46 and the material conduction space 50. The third baffle 54 is provided for interfering with conducting (such as by flowing) of the received solids-depleted material fraction 208 from the material conduction space 46 to the material conduction space 50, and for directing at least the conduction (such as by flowing) of the received solids-depleted material fraction in a downwardly direction to a space below the third baffle 54. The material conduction space 46 is fluidly coupled to the material conduction space 50 by a space below the third baffle 46.

The third compartment 42, the fourth compartment 48 and the third baffle 54 are co-operatively configured such that flow of the received solids-depleted material fraction 208 within the third compartment 28 is directed downwardly to a space below the third baffle 54, and while the received solids-depleted material fraction is being directed towards a space below the third baffle 54, the received solids-depleted material fraction becomes separated into at least the third solids-concentrated material fraction 210 and the second intermediate material fraction 212 by gravity separation, and after having been separated from the received solids-depleted material fraction, the second intermediate material fraction 212 is directed upwardly within the fourth compartment 48, and while the second intermediate material fraction 212 is being directed upwardly within the second compartment 48, the second intermediate material fraction becomes separated into at least the fourth solids-concentrated material fraction 214 and a finer solids-depleted material fraction 216. The finer solids-depleted material fraction 216 may be recovered as an overflow from the fourth compartment 48.

In some embodiments, for example, the gravity settling region 52 includes a plurality of fluid passages defined between closely spaced inclined surfaces. Providing these fluid passages defined between closely spaced inclined surfaces improves efficiency of separation of a finer solid-concentrated material fraction 214 from the second intermediate material fraction 212 within the fourth compartment 48 (i.e. increases the fraction of solids that is separated from the second intermediate material fraction within the fourth compartment). This is because the providing of this feature reduces the distance a solid particle or a floc particle must travel before settling on a solid surface, and then directs the settled particle towards the second collection region. In some embodiments, for example, the plurality of fluid passages is defined by a second tube settler disposed within the fourth compartment 48. In some embodiments, for example, the plurality of fluid passages is defined by a second tube settler disposed within the fourth compartment 48.

A second collection region 56 is disposed below the third and fourth compartments 42, 48. In this respect, the second collection region is disposed below the third baffle 54. In some embodiments, for example, the lowermost edge 58 of the third baffle 54 is disposed above the second collection region by a minimum distance of at least three (3) feet, such as at least 3.5 feet. The second collection region is for collecting a separated solids-comprising fraction that has separated, by gravity settling, from the received solids-depleted material fraction. The separated solids-comprising fraction includes the third solids-concentrated material fraction and the fourth solids-concentrated material fraction. In some embodiments, for example, the second collection region is defined by a container bottom 36.

In some embodiments, for example, after a sufficient quantity of the separated solids-comprising fraction has been collected within the second collection region 56, the separated solids-comprising fraction that has been collected within the second collection region is discharged from the apparatus. In some of these embodiments, for example, the discharging is effected by a material transfer (or conveyor) system 40.

In some embodiments, for example, the transferring or conveyance of the solids collected within the second collection region 56 is effected while, in parallel, the slurry material is being supplied to the apparatus 10 and treated by the apparatus 10 to effect separation of solids from the supplied slurry material, as above described.

In some embodiments, for example, a material transfer (or conveyor) system 40 is provided for removing the collected solids from both of the first and second collection regions 34, 56.

In this respect, in some embodiments, for example, the material transfer system 40 includes an auger (such as a cross auger), driven by a drive gear 72. The material transfer system includes the first and second collection regions 34, 56 and is configured to receive solids which have become separated from the supplied slurry material 200, by gravity settling, as described above. The auger is configured to transfer or convey the collected solids-comprising fraction within the second collection region 56 to the first collection region 34, for combination with the solids-comprising fraction that has been collected within the first collection region 34, and then transfer or convey the combined solids-comprising fractions within the first collection region 34 to the suction of a discharge pump 80 to enable transferring of the solids for disposal. The material transfer system is disposed and extends below the second baffle 44. While a flow of the supplied slurry material 200 is being supplied to the apparatus 10 through the inlet 14 and being treated by the apparatus to effect separation of solids from the supplied slurry material, as above-described, and in parallel with the material transfer system forcing the transfer or conveyance of the collected solids from one or more of the collection regions 34, 56, the baffle 44 co-operates with the material conveyor system to effect direction of at least a large fraction (such as all, or substantially all) of the flow of the first intermediate material fraction 204 towards the weir 45, and mitigate short-circuiting between the second and third compartments 16, 28 by flow underneath the second baffle 44. In some embodiments, for example, the co-operation is effected by positioning the baffle 44 in close proximity to the material transfer system.

In some embodiments, for example, the finer solids-depleted material fraction 216 is discharged from the fourth compartment 48 as a purified fluid material, by overflowing a weir 49 of the fourth compartment into a purified fluid material collection region 60. In some embodiments, for example, the purified fluid material overflows the fourth compartment 48 and is collected in a trough 61. The purified fluid material that is collected within the purified fluid material collection region may be returned to the process from which it is originally derived (for example, in the case where the slurry material includes spent drilling fluid, the collected fluid may be supplied to a wellbore for circulation within the wellbore during drilling).

A process for treating a slurry material will now be described.

A slurry material 200 is supplied to a first solids separation zone 2. In some embodiments, for example, the slurry material includes a pre-cursor slurry material that has been admixed with a settling agent (such as a flocculant). The supplied slurry material 200 is flowed in a downwardly direction through the turbulent flow mitigation device 26 within the first compartment 12 to generate a downwardly flowing characteristic-adjusted slurry material. In some embodiments, for example, the turbulent flow mitigation device 26 includes an apertured plate. In some embodiments, for example, the turbulent flow mitigation device includes a diffuser. In some embodiments, for example, the turbulent flow mitigation device 26 effects adjustment to the flow characteristics of the supplied slurry material such that the flow characteristics of the supplied slurry material are transformed from turbulent flow to laminar flow.

The first intermediate material fraction 204 of the downwardly flowing characteristic-adjusted slurry material is then re-directed in an upwardly direction within the second compartment 28. In this respect, flow reversal is effected to the flow of the flow characteristic-adjusted slurry material. This promotes gravity settling of the solid particles (or the flocs) as the first solids-concentrated material fraction 202, such that, separation of at least the first solids-concentrated material fraction 200 and the first intermediate material fraction 204 is effected from the supplied slurry material 200.

As the first intermediate material fraction 204 is flowed in an upwardly direction, further gravity settling of the solid particles (or flocs) is effected, to effect separation of the first intermediate material fraction 204 into, at least, the second solids-concentrated material fraction 206 and the upwardly flowing solids-depleted material fraction 208. In some embodiments, for example, the flowing of the first intermediate material fraction 204 is effected through a plurality of fluid passages defined between closely spaced inclined surfaces. In some embodiments, for example, the plurality of fluid passages is defined by the first tube settler 38. In some cases, for example, the plurality of fluid passages may be defined by a plate settler.

The first and second solids-concentrated material fractions 202, 206 are composed of relatively coarser solids. The first and second solids-concentrated material fractions 202, 206, that have been separated, by gravity settling, from the supplied slurry material, as above-described, is collected within a first collection region 34. In some embodiments, for example, the first collection region 34 is defined by a container bottom 36.

Separation of the second solids-concentrated material fraction 206 from the first intermediate material fraction, by gravity settling, within the second compartment 28, effects the generation of the solids-depleted material fraction flow 208. The solids-depleted material fraction flow 208 includes finer solids that have not been separated by the initial gravity settling.

In some embodiments, for example, the solids-depleted material fraction 208 is further treated within a second solids separation zone 4 to effect production of a purified fluid material. In this respect, the solids-depleted material fraction 208 is directed to overflow the weir 45 into the third compartment 42. Upon being received within the third compartment 42, the solids-depleted material fraction is directed to flow in a downwardly direction to a space disposed below the third baffle 54.

In this respect, in some embodiments, for example, the solids-depleted material fraction flow 208 is subjected to flow reversal by initially directing the flow of the solids-depleted material fraction in a downwardly direction through the third compartment 42 and below the third baffle 54. The directing of the flow of the solids-depleted material fraction to below the third baffle 54 effects flow reversal of the solids-depleted material fraction. The flow reversal promotes gravity settling of finer solid particles (or flocs of finer solid particles).

In this respect, while the flow of the solids-depleted material fraction is directed in a downwardly direction within the third compartment, to below the third baffle 54, separation from the solids-depleted material fraction 208, of at least a third solids-concentrated material fraction 210 and a second intermediate material fraction 212, is effected.

After the separation of the second intermediate material fraction 212 from the solids-depleted material fraction 208, the second intermediate material fraction 212 is directed to flow in an upwardly direction within the fourth compartment 48. As the second intermediate material fraction 212 is flowed in an upwardly direction, further gravity settling of the solid particles (or flocs) is effected to effect separation of the second intermediate material fraction 212 into, at least, the fourth solids-concentrated material fractions 214 and the upwardly flowing finer solids-depleted material fraction 216. In some embodiments, for example, the flowing of the second intermediate material fraction 212 is effected through a plurality of fluid passages defined between closely spaced inclined surfaces. In some embodiments, for example, the plurality of fluid passages is defined by the second tube settler 52. In some cases, for example, the plurality of fluid passages may be defined by a plate settler.

The third and fourth solids-concentrated material fractions 210, 214 include relatively finer solids. The third and fourth solids-concentrated material fractions 210, 214 that have been separated, by gravity settling, from the solids-depleted material fraction, as above-described, is collected within the second collection region 56. In some embodiments, for example, the second collection region is defined by the container bottom 36.

In some embodiments, for example, the third and fourth solids-concentrated material fractions 210, 214 within the second collection region 56 are conveyed to the first collection region for combination with the solids-comprising fraction that has been collected within the first collection region 34. The combined solids-comprising fractions within the first collection region 34 may then be discharged by conveying the combined solids-comprising fractions to the section of a discharge pump 80. In some embodiments, for example, the discharge pump 80 is provided for transferring the collected solids for disposal. In some embodiments, for example, the conveying, in each instance, is effected by a conveyance system 40. In some embodiments, for example, the conveyance system includes cross augers 70 that are drive by a gear drive 72.

Separation of the fourth solids-concentrated material fraction 214 from the upwardly flowing second intermediate material fraction 212, by gravity settling, effects generation of the purified fluid material 216. The purified fluid material may be collected within a purified fluid material collection region 60 by overflow the weir 49 into the material collection region 60. The purified fluid material that is collected within the purified fluid material collection region may be returned to the process from which it is originally derived (for example, in the case where the slurry material includes spent drilling fluid, the collected fluid may be supplied to a wellbore for circulation within the wellbore during drilling).

In the above description, for purposes of explanation, numerous details are set forth in order to provide a thorough understanding of the present disclosure. However, it will be apparent to one skilled in the art that these specific details are not required in order to practice the present disclosure.

Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A material treatment apparatus comprising:
 a first compartment including:
  an inlet for receiving supply of slurry material; and
  a first material conduction space for conducting flow of the supplied slurry material in a downwardly direction;
 a second compartment including a second material conduction space for receiving a first intermediate material of the supplied slurry material and conducting the first intermediate material in an upwardly direction;
 a baffle for interfering with conducting of the supplied slurry material from the first material conduction space to the second material conduction space;
 a turbulent flow mitigation device disposed within the first compartment and configured to, upon interaction with the supplied slurry material, to effect adjustment to the flow characteristics of the supplied slurry material to generate a downwardly flowing flow characteristic-adjusted slurry material, wherein the flow characteristics of the supplied slurry material are transformed from turbulent flow to laminar flow;
 wherein the turbulent flow mitigation device is disposed, relative to the baffle, such that the baffle directs the downwardly flowing flow characteristic-adjusted slurry material to a space below the baffle;
 and wherein the first material conducting space is fluidly coupled, below the baffle, to the second material conduction space, such that the first intermediate material fraction of the downwardly flowing flow characteristic-adjusted slurry material is conducted to the second material conduction space from below the baffle; and
 a collection region disposed below the first and second compartments for collecting a separated solids-comprising fraction that has separated, by gravity settling, from the supplied slurry material.

2. The fluid treatment apparatus as claimed in claim 1, further comprising:
 a tube settler defining a gravity settling region within the second compartment.

3. The fluid treatment apparatus as claimed in claim 1, further comprising:
 a lamellar plate settler for defining a gravity settling region within the second compartment.

4. The fluid treatment apparatus as claimed in claim 1, wherein the turbulent flow mitigation device includes an apertured plate.

5. The fluid treatment apparatus as claimed in claim 1, wherein the turbulent flow mitigation device includes a diffuser.

6. The fluid treatment apparatus as claimed in claim 1; wherein the lowermost edge of the baffle is disposed a minimum distance of at least three (3) feet above the collection region.

7. A material treatment apparatus comprising:
 a first compartment including:
  an inlet for receiving supply of slurry material; and
  a first material conduction space for conducting flow of the supplied slurry material in a downwardly direction;
 a second compartment including a second material conduction space for receiving a first intermediate material of the supplied slurry material and conducting the first intermediate material in an upwardly direction;
 a baffle for interfering with conducting of the supplied slurry material from the first material conduction space to the second material conduction space;
 a diffuser plate disposed within the first compartment and configured to, upon interaction with the supplied slurry material, to effect adjustment to the flow characteristics of the supplied slurry material to generate a downwardly flowing flow characteristic-adjusted slurry material;
 wherein the diffuser plate is disposed, relative to the baffle, such that the baffle directs the downwardly flowing flow characteristic-adjusted slurry material to a space below the baffle;
 and wherein the first material conducting space is fluidly coupled, below the baffle, to the second material conduction space, such that the first intermediate material fraction of the downwardly flowing flow characteristic-adjusted slurry material is conducted to the second material conduction space from below the baffle; and
 a collection region disposed below the first and second compartments for collecting a separated solids-comprising fraction that has separated, by gravity settling, from the supplied slurry material.

8. The fluid treatment apparatus as claimed in claim 7, further comprising:
 a tube settler defining a gravity settling region within the second compartment.

9. The fluid treatment apparatus as claimed in claim 7, further comprising:
 a lamellar plate settler for defining a gravity settling region within the second compartment.

10. The fluid treatment apparatus as claimed in claim 7, wherein the diffuser includes an apertured plate.

11. The fluid treatment apparatus as claimed in claim 7, wherein the lowermost edge of the baffle is disposed a minimum distance of at least three (3) feet above the collection region.

12. A process of separating material fractions from a supplied slurry material comprising:
 flowing the supplied slurry material in a downwardly direction and within a turbulent flow regime so as to effect interaction between the supplied slurry material and a turbulent flow mitigation device, wherein the interaction effects adjustment to the flow characteristics of the supplied slurry material to generate a downwardly flowing flow characteristic-adjusted slurry material, wherein the flow characteristics of the supplied slurry material are transformed from turbulent flow to laminar flow;
 re-directing flow of at least a fraction of the downwardly flowing flow characteristic-adjusted slurry material in an upwardly direction; and
 collecting a separated solids-comprising fraction that has separated, by gravity settling, from the flow characteristic-adjusted supplied slurry material.

13. The process as claimed in claim 12;
 wherein the re-directing of the flow includes that effected by a tube settler.

14. The process as claimed in claim 12;
 wherein the re-directing of the flow includes that effected by a lamellar plate settler.

15. The process as claimed in claim 12;
wherein the turbulent flow mitigation device includes an apertured plate.

16. The process as claimed in claim 12;
wherein the turbulent flow mitigation device includes a diffuser.

17. The process as claimed in claim 12;
further comprising, prior to flowing of the supplied slurry material, admixing a settling aid with a pre-cursor slurry material, wherein the admixing effects generation of the slurry material.

18. The process as claimed in claim 12;
wherein the supplied slurry material is flowing at a rate of up to 1200 gallons per minute.

19. The process as claimed in claim 12;
wherein the supplied slurry material has up to 50 volume percent solid material based on a total volume of the supplied slurry material.

20. The process as claimed in claim 12;
wherein the supplied slurry material has a specific gravity of at least 1.8.

21. A process of separating material fractions from a supplied slurry material comprising:
flowing the supplied slurry material in a downwardly direction and within a turbulent flow regime so as to effect interaction between the supplied slurry material and a diffuser, wherein the interaction effects adjustment to the flow characteristics of the supplied slurry material to generate a downwardly flowing flow characteristic-adjusted slurry material;
re-directing flow of at least a fraction of the downwardly flowing flow characteristic-adjusted slurry material in an upwardly direction; and
collecting a separated solids-comprising fraction that has separated, by gravity settling, from the flow characteristic-adjusted supplied slurry material.

22. The process as claimed in claim 21;
wherein the re-directing of the flow includes that effected by a tube settler.

23. The process as claimed in claim 21;
wherein the re-directing of the flow includes that effected by a lamellar plate settler.

24. The process as claimed in claim 21;
wherein the diffuser includes an apertured plate.

25. The process as claimed in claim 21;
further comprising, prior to flowing of the supplied slurry material, admixing a settling aid with a pre-cursor slurry material, wherein the admixing effects generation of the slurry material.

26. The process as claimed in claim 21;
wherein the supplied slurry material is flowing at a rate of up to 1200 gallons per minute.

27. The process as claimed in claim 21;
wherein the supplied slurry material has up to 50 volume percent solid material based on a total volume of the supplied slurry material.

28. The process as claimed in claim 21;
wherein the supplied slurry material has a specific gravity of at least 1.8.

* * * * *